United States Patent [19]
Kang et al.

[11] Patent Number: 6,160,555
[45] Date of Patent: *Dec. 12, 2000

[54] METHOD FOR PROVIDING A CUE IN A COMPUTER SYSTEM

[75] Inventors: Beng Hong Alex Kang, Farrer Court; Sun-Woo Chung, Parkwest, both of Singapore

[73] Assignee: Hewlett Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/971,511

[22] Filed: Nov. 17, 1997

[51] Int. Cl.[7] ........................................... G06F 17/24

[52] U.S. Cl. .................. 345/358; 345/145; 707/531; 707/540; 707/541

[58] Field of Search .................................... 345/358, 978, 345/145, 339, 333, 326; 707/535, 531, 541, 539, 540, 530

[56] References Cited

U.S. PATENT DOCUMENTS

| | | | |
|---|---|---|---|
| 5,231,698 | 7/1993 | Forcier | 707/541 |
| 5,461,711 | 10/1995 | Wang et al. | 345/326 |
| 5,546,538 | 8/1996 | Cobbley et al. | 395/200.33 |
| 5,590,257 | 12/1996 | Forcier | 707/530 |
| 5,600,765 | 2/1997 | Ando et al. | 345/433 |
| 5,664,210 | 9/1997 | Fleming et al. | 707/539 |
| 5,778,404 | 7/1998 | Capps et al. | 707/531 |
| 5,825,308 | 10/1998 | Rosenberg | 341/20 |
| 5,832,528 | 11/1998 | Kwatinetz et al. | 345/326 |
| 5,864,339 | 1/1999 | Bedford-Roberts | 345/339 |

*Primary Examiner*—Raymond J. Bayerl
*Assistant Examiner*—Cuong T. Thai

[57] ABSTRACT

A novel cuing feature in a handheld computer device having a handwriting recognition (HWR) input device and a display is disclosed. The handheld computer device provides text-editing functions to a user, who can enter or edit a character at a text cursor position on the display using the HWR input device. If the user selects a character mode before entering or editing a character, a cue sets off to indicate such a selection while allowing the user to continue focusing at the text cursor position. Known examples of character modes are the Shift, Caps Lock and Num Lock.

12 Claims, 3 Drawing Sheets

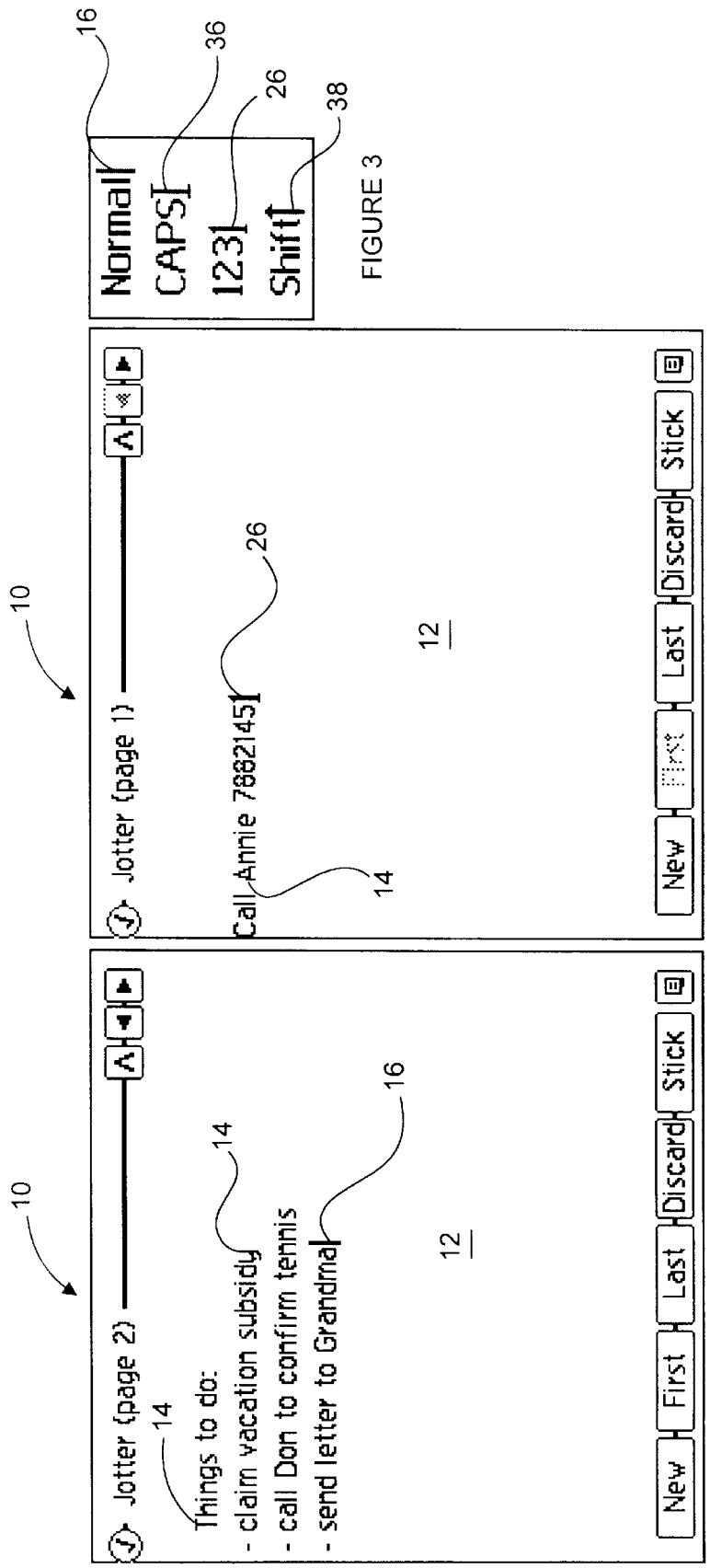

METHOD FOR PROVIDING A CUE IN A COMPUTER SYSTEM

FIELD OF INVENTION

The invention relates generally to data entry and display in a computer system. In particular, it relates to a method for providing a computer system user with a cue while the user is entering or editing a character at a text cursor position on a display of the computer system with an input device.

BACKGROUND OF THE INVENTION

With the advent of the miniaturization of computer systems, handheld or palmtop computers and Personal Digital Assistants have become prevalent. Many of these handheld devices are built to fit into the hand or palm of a mobile user. Therefore the associated keypads to these handheld devices are small and usually have a limited number of, or small, keys or buttons for input purposes. To allow the mobile user to enter data more easily, such handheld devices are commonly equipped with a handwriting recognition (HWR) system using a stylus and a touch screen.

In a HWR system for entering or editing characters, a stylus is used to write the characters on a touch screen. The characters are then recognized by the HWR system and converted into ASCII characters as if they had been entered using a keypad. Typically, a recognized character is inserted at the current text cursor position.

There are three main approaches to HWR systems: cursive or script recognition, discrete recognition and unistroke recognition. In cursive recognition systems, words are written in a natural way by the user, which may consist of both 'joint' and 'broken' characters, and recognition usually takes place as each word is written. In discrete recognition systems, characters are printed in a natural way by the user, and recognition takes place as each character is written. In unistroke recognition systems, each character is written as one continuous stroke, which may not necessarily be natural in appearance, and each character is recognized as it is written. Therefore, a unistroke character is usually a symbolic representation of the character.

Since cursive and discrete recognition systems attempt to recognize natural handwriting, they have inherent disadvantages. For example, the accuracy of such systems is usually hampered by the fact that they are not able to distinguish between letters which have similar upper case and lower case appearances while differing only in relative sizes. Confusion can also arise when these systems attempt to differentiate between letters and numbers, for example: 'I' and '1' (one), 'O' and '0' (zero), and 'S' and '5' (five).

Some unistroke recognition implementations on the other hand, use character modes to solve the letter case problem and letter-number confusion described above. These unistroke recognition approaches require users to learn a predefined unique stroke, or "gesture," for each letter and number, and known Shift, Caps Lock and Num Lock character modes. In these systems, the character mode gestures behave like their functional equivalent keys or buttons found on keypads. Thus each letter is represented by only one gesture, and the Shift or Caps Lock character mode gesture, when used, enables the next written letter to be recognized as an upper case letter. Similarly, the Num Lock character mode is used to tell the unistroke recognition system that the user will subsequently be writing numbers, so that it will not mistake a '5' (five) for an 'S', or a '0' (zero) for an 'O', even though these letter-number pairs share the same unique gestures. The Caps Lock and Num Lock character mode gestures act as toggles, turning the character modes on or off just like their keypad equivalents.

Many of these commercially available unistroke recognition systems, e.g., Graffiti from Palm Computing, also use on-screen user interfaces in the form of dialog boxes or windows to select the different character modes and to display the character mode status. In operation, the user activates each character mode with a "button" on the touch screen which is part of the on-screen user interface dialog box or window. The on-screen character mode buttons commonly available are the Caps Lock and Num Lock buttons. Other character modes supported by some unistroke recognition systems are Shift, Punctuation and Extended Character (for selecting European accented characters). These character modes are usually not accessible through on-screen character mode buttons but by unique gestures, and operate only on the next written character. In general, selecting each of the above character modes may be viewed as selecting a predetermined group of characters within the ASCII character set.

While such commercially available unistroke recognition systems using on-screen user interfaces have achieved substantial use, they suffer from disadvantages. A disadvantage addressed by the present invention is that users have to shift their focus between the text cursor position and the on-screen character mode buttons during the selection of a character mode, or when they want to check the character mode status. This shift of focus can be quite tedious. This problem of constantly shifting the focus between the text cursor location and on-screen character mode buttons becomes more acute when users do not use the on-screen character mode buttons to select the character modes. Since these users will use the character mode gestures instead, they will have to look at the on-screen character mode buttons to check whether or not their character mode selection was successfully implemented. This procedure can be even more trying.

In extreme cases, the on-screen user interface dialog box or window takes up precious screen space. This is undesirable for handheld devices, which have small display areas or screens.

Accordingly, it is an object of the present invention to provide a method for cuing a computer system user who is entering or editing a character at a text cursor position on a display of a computer system with an input device.

SUMMARY OF THE INVENTION

A cuing method is provided for a user of a computer system who is entering or editing characters. Such a computer system has an input device to enter characters and a display to show the characters entered. The computer system indicates a position on its display to the user where a character will be entered or edited. The user may then select one of a series of predetermined groups of characters by using the input device. After selecting the predetermined group of characters, the method enables the user to receive an indication of the selection. In this manner, the user will be able to maintain visual focus at the position on the display and still know the predetermined group of characters selected without needing to shift his focus elsewhere. The computer system then allows the user to further select a character from the selected group of characters.

In a preferred embodiment of the cuing method, a text cursor is used to indicate to the user the position on the display where the character is being entered. The text cursor is also used to provide a visual indication to the user on the selection of the predetermined group of characters. Also, a handwriting recognition input device can be used for entering the characters.

BRIEF DESCRIPTION OF THE DRAWINGS

The invention will be better understood with reference to the drawings, in which:

FIG. 1 shows a display of a handheld device executing an application program according to a preferred embodiment of the invention with the text cursor shown in normal character mode;

FIG. 2 shows the display in FIG. 1 with the text cursor indicating the Num Lock character mode;

FIG. 3 shows the different text cursors representing the corresponding character modes in the handheld device in FIG. 1;

DESCRIPTION OF THE EMBODIMENTS OF THE INVENTION

Figure 4:
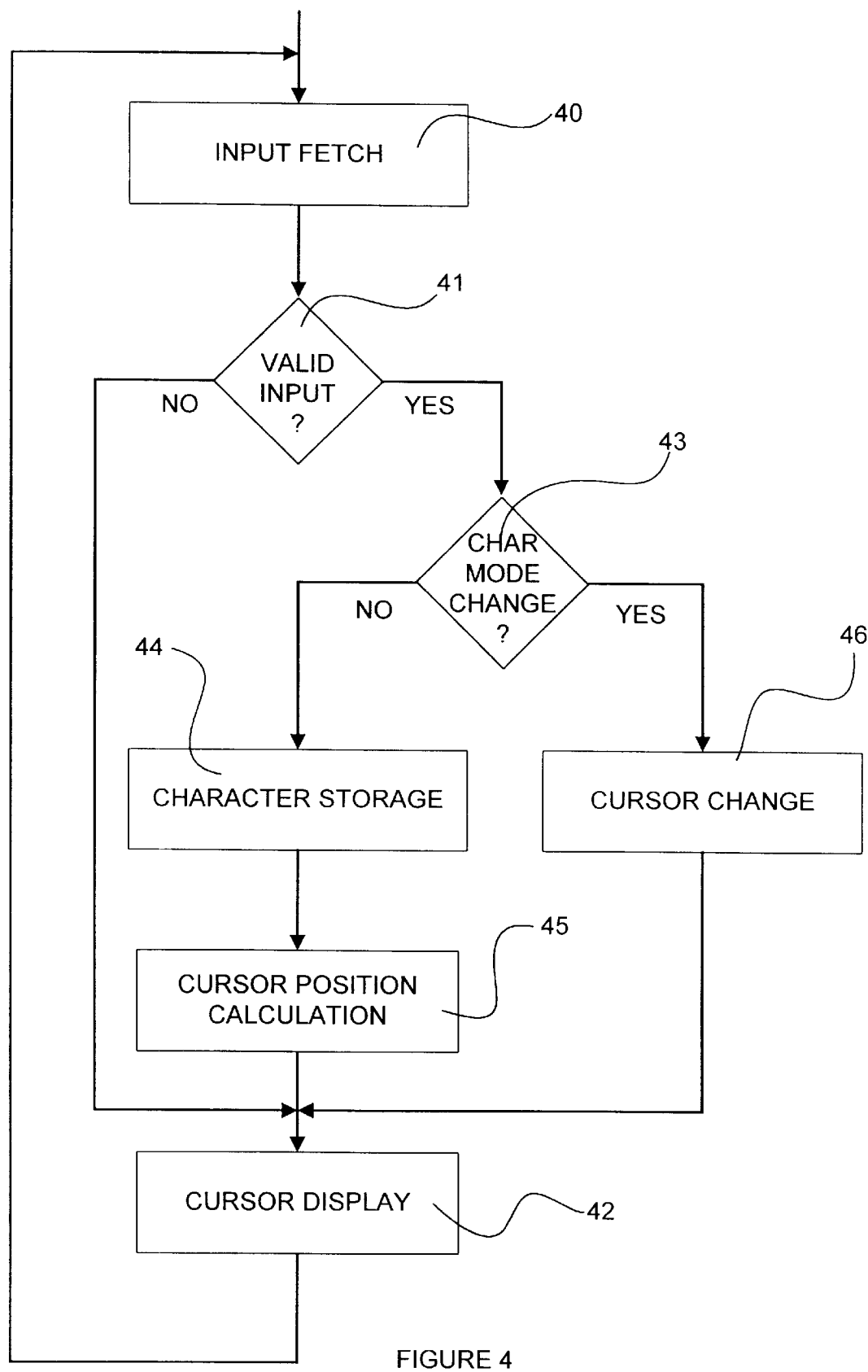
FIG. 4 is a diagram showing part of the control flow in the application program relating to a text-editing window object according to the preferred embodiment in FIG. 1.

Reference is first made to FIG. 1 to describe a screen 10 of a handheld device (not shown) which is executing an application program according to a preferred embodiment of the invention. The handheld device screen 10 is shown to display a Graphical User Interface (GUI) text-editing window 12 of an application program which is programmed in an object-oriented (OO) environment. Text, comprising of characters 14, has been entered into the application program by way of either selecting keys from a keypad (not shown) or writing or making gestures on a unistroke HWR system (also not shown) and is displayed in the text-editing window 12. Further characters 14 can be entered subsequently into the application program, and the next character 14 will be displayed at the position in the text-editing window 12 indicated by a Normal cursor 16. In the text-editing window 12 shown in FIG. 1, the Normal cursor 16 is indicating a lower case letter character mode while in FIG. 2, the text-editing window 12 features a Num Lock cursor 26, which is indicating a number character mode. A text cursor having multiple indicia is possible because a novel cuing feature, which will be described in greater detail below, is implemented in the handheld device through the application program to provide the user with a visual cue or indication of the character mode change and status while allowing the user to maintain visual focus on the text cursor position.

As shown in FIG. 1, the form of the Normal cursor 16 is substantially different from that of the characters 14. In addition to the form, the Normal cursor 16 also distinguishes itself from the characters 14 by way of blinking (cannot be shown). Thus the Normal cursor 16 can be clearly seen by the user as appearing immediately after the phrase "send letter to Grandma," and a next character 14, if entered, will appear at this position.

The Normal cursor 16 indicates the position where the next character 14, which will be recognized as a lower case letter, will appear. In the event that a character mode changes because the user has selected a relevant on-screen character mode button or made a relevant gesture on the unistroke HWR system, the novel cuing feature will provide a visual cue, or indication, to the user at that position. A text cursor change will result. An exemplary text cursor which is used for indicating the number character mode is shown in FIG. 2 as the Num Lock cursor 26. Some examples of text cursors that may be used to indicate the other character modes can be seen in FIG. 3, where a Caps Lock cursor 36 is shown next to the word "CAPS" for indicating the upper case letter character mode. Similarly, a Shift cursor 38 is shown next to the word "Shift" for indicating another known upper case letter character mode.

The novel cuing feature will now be described in more detail with reference to both FIG. 1 and FIG. 4. The way in which a text cursor is controlled, and displayed, is dependent on the operating system (OS) of the handheld device; and in the case of the OO application program, it is defined within an object that provides for the text-editing window 12. In the OO programming environment, a computational problem is partitioned into a set of communicating entities called objects. Each object is comprised of data and a set of functions permitted to operate on the data.

Thus in the text-editing window object, the Normal cursor 16 is stored as a bitmap, either as a separate image or as part of the ASCII character set in a private memory within the application program or a global system memory within the OS. The other text cursors, such as the Num Lock cursor 26, Caps Lock cursor 36 and Shift cursor 38, are also stored within the same memory but at different memory addresses. In addition, the image comprising the characters 14, the Normal cursor 16, and the rest of the GUI as shown in FIG. 1 is stored in a virtual display memory in the text-editing window object. A text-editing window screen display routine, when called by the text-editing object, then updates the screen 10 with the contents of the virtual display memory.

Therefore each time the text-editing window 12 is called to the top of the screen by the user, when more than one application program is in execution, the text-editing window object becomes active. In anticipating a character input from the user, the application program makes use of an input event manager. The input event manager is another object programmed in the OO environment. It is also a shared resource among all the OO application programs in execution in the handheld device. This anticipated character 14 will thus be provided by the input event manager, which manages the keypad, on-screen input buttons and the unistroke HWR system. Alternatively, the user may make a character mode change and this input is in turn provided to the text-editing window object.

FIG. 4 shows, by means of a flow diagram, part of the control flow in the application program relating to the text-editing window object. As can be seen at the top of the flow diagram, the input event manager provides an input to the text-editing window object while it is in an INPUT FETCH state 40.

When an input is received from the input event manager, the text-editing window object will then enter a VALID INPUT? state 41. The input is validated in this state; if it is not a character 14 or a character mode select information, the text-editing window object will enter a CURSOR DISPLAY state 42. Otherwise the text-editing window object will enter a CHAR MODE CHANGE? state 43. Thus if the input is not relevant, the text-editing window object will enter the CURSOR DISPLAY state 42 where the bitmap of the Normal cursor 16 stored in the memory, which is indexed by the current memory address-pointer, is read. The bitmap of the Normal cursor 16 is subsequently stored in the virtual display memory, taking into account the position of the Normal cursor 16 within the text-editing window 12. Subsequently, the text-editing window screen display routine is called to update the screen 10 with the contents of the virtual display memory. While in this state, the text-editing window object uses a system timer interrupt, or a timer routine within the application program, to control the blinking pattern of the Normal cursor 16.

However, if the input from the input event manager is valid, the text-editing window object will enter the CHAR MODE CHANGE? state 43. At this point, the input is again validated by the text-editing window object with regard to its content.

If the input, by way of the keypad or the unistroke HWR system, is one containing a character 14 information, the text-editing window object will enter a CHARACTER STORAGE state 44. In this state, the text-editing window object stores the character 14 information in a text buffer and subsequently updates the virtual display memory with this information. The text-editing window object then calculates a new text cursor position where the Normal cursor 16 will appear, when it subsequently enters a CURSOR POSITION CALCULATION state 45. The text-editing window object then enters the CURSOR DISPLAY state 42.

Otherwise if the input, by way of the on-screen character mode buttons or the unistroke HWR system, is one containing a character mode select information, the text-editing window object will enter a CURSOR CHANGE state 46. Depending on which character mode the user may have selected, the previous memory address-pointer will be modified accordingly to index the corresponding text cursor bitmap. As a consequence the bitmap of, e.g., the Num Lock cursor 26, is read from the memory which is indexed by using the current memory address-pointer when the text-editing window object subsequently enters CURSOR DISPLAY state 42. The result is a text cursor displayed with an appropriate cue to indicate a change of character mode to the user.

Figure 5:
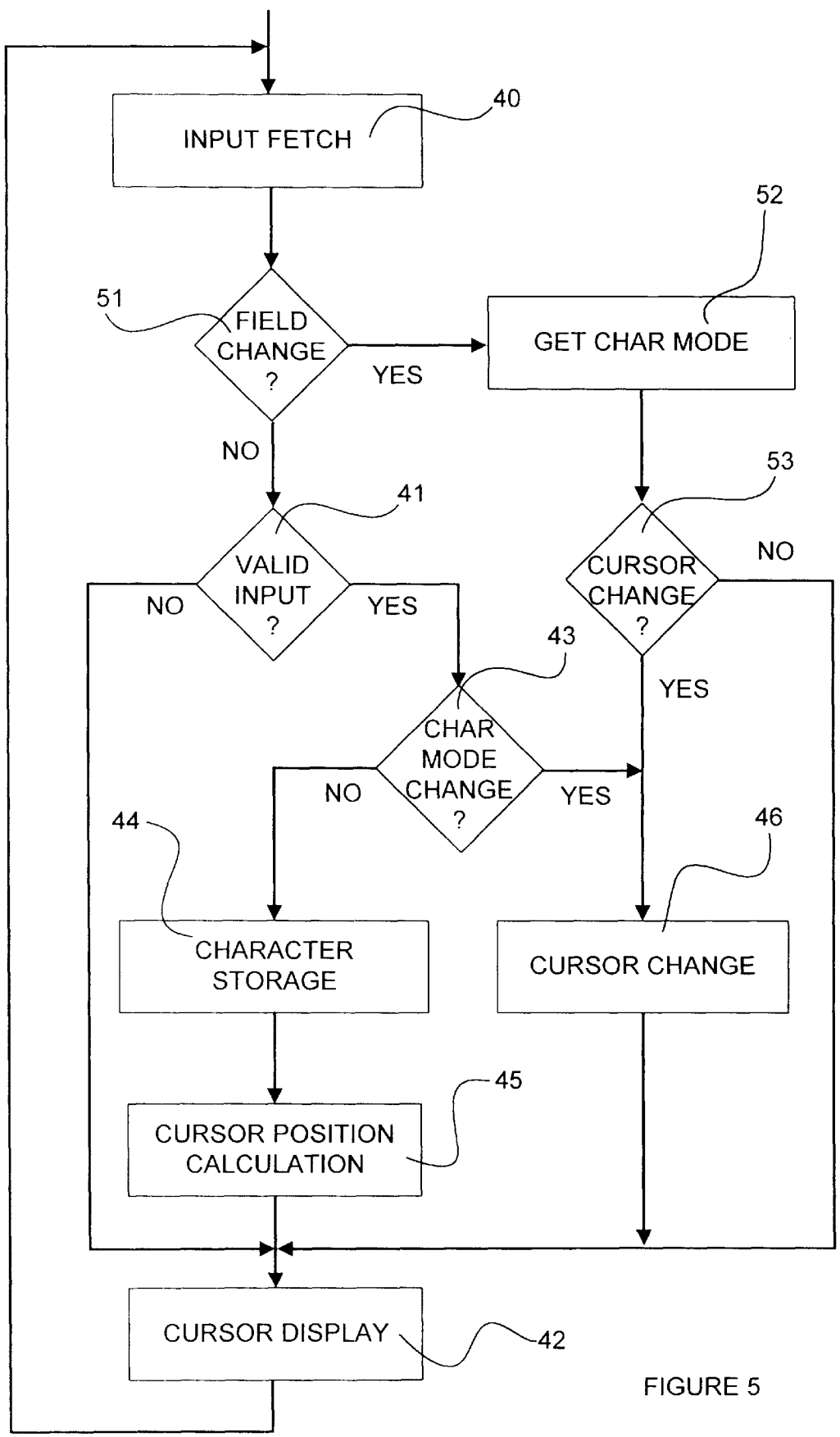
FIG. 5 is a diagram showing part of the control flow in an application program relating to a text-editing window object according to a second embodiment.

Reference is now made to FIG. 5 to describe a second embodiment of the invention in which an application program is designed to allow a text-editing window 12 to have more than one text input field. The character mode that each text input field is in is independent and may be different from the other text input fields. For example, the phrase "send letter to Grandma," shown in FIG. 1, may appear in the same text-editing window 12 as the phrase "Call Annie 7882145," shown in FIG. 2, where the former phrase is part of a first text input field and the latter phrase is part of a second text input field. Thus, the Normal cursor 16 will present itself when the next character 14 is to be entered into the first text input field, whereas the Num Lock cursor 26 will show itself when the next character 14 is to be entered into the second text input field. With the help of a flow diagram shown in FIG. 5, the control flow in the application program relating to the text-editing window object will be described.

In addition to the previously described states of the text-editing window object, FIG. 5 contains a FIELD CHANGE? state 51, a GET CHAR MODE state 52 and a CURSOR CHANGE? state 53. On receiving an input from the input event manager in the INPUT FETCH state 40, the text-editing window object enters the FIELD CHANGE? state 51. In this state, the text-editing window object checks whether a user request, by way of the keypad or the unistroke HWR system, is made to change the text input field where the next character 14 will be entered. If a text input field other than the current input field is selected, the text-editing window object will enter the GET CHAR MODE state 52. Otherwise, the text-editing window object will enter the VALID INPUT? state 41.

When the text-editing window object enters the GET CHAR MODE state 52, it will recall the corresponding character mode status of the selected text-input field. The text-editing window object then checks if the text cursor needs to be changed accordingly when it subsequently enters the CURSOR CHANGE? state 53. If a text cursor change is required, the text-editing window object will enter the CURSOR CHANGE state 46. Otherwise, it will enter the CURSOR DISPLAY state 42.

The above embodiments can be modified in many ways. For example, the novel cuing feature may take other different forms, and such forms can include the use of audio cues instead of different text cursors. By doing so, the user can be informed of the character mode change while maintaining a focus at the text cursor position during the change. By the same token an eccentric motor, for example, may be also used to provide vibrational prompts to cue the user. Similarly, the color or blinking pattern of the text cursor may also be changed to achieve the same results, as long as the color or blinking pattern is sufficiently varied to provide the user with a distinctive indication. The different embodiments of the novel cuing feature described may also be modified to provide a cue when the user has made an editing mode change, such as limited text cursor change to indicate the toggling between the Insert and Typeover modes in the prior art.

In another example, a voice activated input device may be used to select the characters and make character mode changes in addition to, or in place of, the keypad, the on-screen buttons or the unistroke HWR system.

It should also be noted that the novel cuing feature is useful for all text-editing functions in the handheld device, or in any, other computer system. In addition to implementing the novel cuing feature in the application program described above, one may also incorporate the idea in a word-processor, text-graphics editors, text-photo editors or text input fields such as those used in dialog boxes or windows. Additionally, the novel cuing feature may be implemented in application programs that allow the user to mark a character string which is selected for replacement with a character. The character can then be entered after the character mode is selected. For example, the highlighted area surrounding a character string may change color, among the many ways previously described, according to the character mode change. Finally, it should not be construed that the characters described above are limited to ASCII characters. As such, selecting the exemplary known character modes may be viewed as selecting, in general, predetermined groups of characters.

The novel cuing features described as exemplary of the invention can be modified as required and such modifications are within the scope of the description and claims.

We claim:

1. A method for cueing a computer system user entering or editing characters for display on a display of the computer system having an input device, comprising the steps of:

using a text cursor to indicate a position on the display to the user where a character will be entered;

enabling the user to select one of a plurality of predetermined groups of characters using the input device; and varying the blinking pattern of the text cursor to indicate the selection of the predetermined group of characters to the user while the user is substantially maintaining visual focus at the position on the display.

2. A method for entering hand-written characters on a computer system and for cueing a user of the computer system to increase usability of the computer system, the computer system including a display and an input device, the method comprising:

receiving and deciphering each hand-written character according to a selected character recognition mode;

allowing a text cursor to be displayed on the display to indicate to the user at which position a recognized hand-written character will be displayed;

displaying on the display each hand-written character recognized by the selected character recognition mode at the text cursor position;

allowing a user to select a second character recognition mode from a plurality of predetermined character recognition modes by using the input device; and varying the text cursor to indicate the selection of the second character recognition mode so the user can be substantially aware of the selected second character recognition mode while entering handwritten characters.

3. A method as claimed in claim 2, wherein a shape of the text cursor is varied to indicate the selected character recognition mode.

4. A method as claimed in claim 2, wherein a colour of the text cursor is varied to indicate the selected character recognition mode.

5. A method as claimed in claim 2, wherein a blinking pattern of the text cursor is varied to indicate the selected character recognition mode.

6. A method as claimed in claim 2, wherein the character recognition modes recognize characters contained in the ASCII character set.

7. A method as claimed in claim 2, wherein the plurality of character recognition modes includes a Caps Lock character recognition mode that allows the computer system to recognize characters entered by the user as upper case characters.

8. A method as claimed in claim 2, wherein the plurality of character recognition modes includes a Num Lock character recognition mode that allows the computer system to recognize characters entered by the user as number characters.

9. A method as claimed in claim 2, wherein a touch screen enables the user to select one of the plurality of character recognition modes.

10. A method as claimed in claim 2, wherein a touch screen and handwriting recognition enables the user to select one of the plurality of character recognition modes.

11. A method as claimed in claim 2, wherein a voice activated input device enables the user to activate one of the plurality of character recognition modes.

12. A method as claimed in claim 2, wherein a keypad enables the user to select one of the plurality of character recognition modes.

* * * * *